United States Patent [19]

Louden et al.

[11] Patent Number: 5,456,832
[45] Date of Patent: Oct. 10, 1995

[54] APPARATUS FOR PREPARING A MATERIAL FOR HIGH PRESSURE DELIQUIFICATION

[75] Inventors: James A. Louden, Chester; Brian F. Hawkins, Hillsborough; Wayne D. Hann, Sr., deceased, late of Pattenburg, all of N.J., by Cheryl Hann, Executrix

[73] Assignee: Komline-Sanderson Engineering Corp., Peapack, N.J.

[21] Appl. No.: 174,037

[22] Filed: Dec. 28, 1993

[51] Int. Cl.[6] .................................................. B01D 33/04
[52] U.S. Cl. .......................... 210/386; 100/118; 100/151; 210/143; 210/400
[58] Field of Search .......................... 100/118–120, 151, 100/153; 210/143, 386, 400, 401

[56] References Cited

U.S. PATENT DOCUMENTS

| | | | |
|---|---|---|---|
| 1,875,075 | 8/1932 | Mason | 210/783 |
| 2,909,804 | 10/1959 | Means | 18/4 |
| 3,459,122 | 8/1969 | Pastoors | 100/118 |
| 3,605,607 | 9/1971 | Gujer | 100/154 |
| 3,680,476 | 8/1972 | Pfeiffer | 100/151 |
| 3,699,881 | 10/1972 | Levin et al. | 210/401 |
| 3,795,470 | 3/1974 | De Mets | 100/151 |
| 3,796,148 | 3/1974 | Heissenberger | 100/118 |
| 3,796,149 | 3/1974 | Heissenberger | 100/118 |
| 3,823,062 | 7/1974 | Ward | 162/123 |
| 3,894,486 | 7/1975 | Sparowitz et al. | 100/118 |
| 3,907,473 | 9/1975 | de Mets | 100/151 |
| 3,951,809 | 4/1976 | Kollmar | 210/241 |
| 3,971,310 | 7/1976 | Kondos et al. | 100/118 |
| 3,973,483 | 8/1976 | Appenzeller | 100/153 |
| 4,053,419 | 10/1977 | Pav | 210/386 |
| 4,142,971 | 3/1979 | Le Fur et al. | 210/400 |
| 4,144,807 | 3/1979 | Bastgen | 100/118 |
| 4,168,236 | 9/1979 | Bähr | 210/294 |
| 4,181,616 | 1/1980 | Bahr | 210/297 |
| 4,236,445 | 12/1980 | Sernagiotto et al. | 100/118 |
| 4,266,474 | 5/1981 | Bähr | 100/118 |
| 4,297,215 | 10/1981 | Altmeyer et al. | 210/401 |
| 4,584,936 | 4/1986 | Crandall et al. | 100/118 |
| 4,587,023 | 5/1986 | Srivatsa et al. | 210/744 |
| 4,622,894 | 11/1986 | Crandall et al. | 100/118 |
| 4,681,033 | 7/1987 | Crandall et al. | 100/118 |

(List continued on next page.)

FOREIGN PATENT DOCUMENTS

| | | | |
|---|---|---|---|
| 643772 | 6/1962 | Canada . | |
| 271629 | 6/1988 | European Pat. Off. . | |
| 405184 | 1/1991 | European Pat. Off. . | |
| 633675 | 2/1928 | France . | |
| 2855160 | 6/1979 | Germany . | |
| 3404422 | 1/1984 | Germany . | |
| 3715828 | 11/1988 | Germany . | |
| 58-119496 | 7/1983 | Japan . | |
| 58-3800 | 10/1983 | Japan . | |
| 60-21039 | 5/1985 | Japan | 210/401 |
| 60-148698 | 8/1985 | Japan | 210/400 |
| 1333594 | 4/1986 | U.S.S.R. . | |
| 1425625 | 2/1976 | United Kingdom . | |
| 2115714 | 3/1982 | United Kingdom . | |
| 2117659 | 10/1983 | United Kingdom | 201/400 |
| 2166660 | 11/1985 | United Kingdom . | |

*Primary Examiner*—Peter A. Hruskoci
*Attorney, Agent, or Firm*—Lerner, David, Littenberg, Krumholz & Mentlik

[57] ABSTRACT

A belt filter press having a wedge zone which can be adjusted during operation of the filter press to prepare a sludge or other material to be deliquified in the most efficient manner for high pressure deliquification also includes a sealing arrangement for sealing the marginal edges of the upper and lower belts, a tapered slide cam assembly on either side of the belts for adjusting the wedge angle in a controlled manner, rack and pinion assemblies associated with hydraulic cylinders on either side of the belts to ensure the uniform movement of the lower belt supports, and the staggered arrangement of upper and lower belt support members where the lower belt support members are concave-like in shape to facilitate the sealing of the marginal edges of the belts, as well as to form a confined pocket which will facilitate the shearing action induced in the material to be deliquified.

44 Claims, 5 Drawing Sheets

U.S. PATENT DOCUMENTS

| | | | |
|---|---|---|---|
| 4,707,272 | 11/1987 | Kistler | 210/709 |
| 4,718,843 | 1/1988 | Carlsson | 425/371 |
| 4,731,188 | 3/1988 | Johnson | 210/783 |
| 4,836,100 | 6/1989 | Johnson et al. | 100/118 |
| 4,911,841 | 3/1990 | Put | 210/401 |
| 4,961,862 | 10/1990 | Janecek | 210/401 |
| 4,971,691 | 11/1990 | Meylor et al. | 210/400 |
| 4,986,910 | 1/1991 | Uyama et al. | 210/400 |
| 5,021,159 | 6/1991 | Bliss et al. | 210/396 |
| 5,022,989 | 6/1991 | Put | 210/386 |
| 5,066,399 | 11/1991 | Sugihara et al. | 210/401 |
| 5,109,764 | 5/1992 | Kappel | 100/99 |
| 5,133,872 | 7/1992 | Baldwin et al. | 210/709 |
| 5,238,565 | 8/1993 | Barcomb et al. | 210/401 |

APPARATUS FOR PREPARING A MATERIAL FOR HIGH PRESSURE DELIQUIFICATION

BACKGROUND OF THE INVENTION

The present invention relates generally to filter presses for separating liquids and solids in sludges, slurries and other feed materials, and more specifically to presetting the thickness and consistency of such material in the wedge zone prior to advancing the material into a higher pressure zone.

Belt filter presses are used to separate liquids (most often water) and solids in sludges, slurries, fiber suspensions, cellulose or other fibrous materials and similar substances. The materials to be dewatered or deliquified could be sewage, industrial waste, paper pulp or any other biological, chemical, mineral-based or industrial material requiring deliquification. The term "sludge" will be used herein to refer to any substance which might require deliquification. The need to deliquify a substance can range from a desire to dry a substance for incineration (so that less fuel is used during the incineration process) to simply removing excess liquid prior to transportation (in order to decrease transportation costs). Since all sludges differ from one another in consistency, viscosity, density, water content and many other parameters, separating the liquids from the solids in sludges is a complex art.

Belt filter presses can employ several stages at which different techniques are used to remove the liquid from a sludge. The use of these different stages improves filtering efficiency throughout the belt filter press. Even prior to commencing liquid removal, a suspension, which might only be one half to one percent solids, can be treated with a polymer or other chemical which coagulates or flocculates the solids. In a typical belt filter press, the flocculated sludge is then moved into a gravity drainage section or stage of the belt filter press where the sludge is stirred and churned so that free water drains off by gravity. At the end of the gravity drainage zone, the sludge could be near 10% solids. The gravity drainage stage is used primarily to remove free water, and to prepare the sludge for, in some cases, a suction stage where additional water is suctioned off and/or a low pressure stage which continues to prepare the sludge for higher pressure stages of deliquification. It is at the higher pressure stages that the sludge is carried between an upper and a lower belt which together follow a path between progressively smaller perforated drums, and finally between progressively smaller solid rollers. While the pressure in the drum area may be considered to be a medium pressure, for purposes of this application, the perforated drum stage will be considered part of the high pressure stage.

As those in the art can appreciate, the pressure imparted to the material between the upper and lower belts in the high pressure stage increases greatly from the largest perforated drum to the smallest solid roller. After completing travel through the high pressure stage, the upper and lower belts separate from one another, and the dried sludge or cake, which can typically be 30% solids, is discharged.

To more efficiently prepare a sludge for the high pressure stage, a wedge zone is often interposed between the gravity drainage stage, suction stages, etc. and the high pressure stage. The result is greater deliquification in the high pressure stage since the wedge zone prepares the sludge for the application of higher pressures. In the wedge zone, the upper belt and the lower belt (carrying the sludge therebetween) converge with one another, applying light pressure to set the thickness and consistency of the sludge prior to reaching the largest perforated drum. Light dewatering or deliquifying continues to occur in the wedge zone as the sludge is compressed between the belts. The degree to which the sludge is compressed corresponds to the angle of convergence of the belts or the wedge angle. The wedge angle may be fixed at all times or mechanically adjusted prior to running the filter press to accommodate a particular sludge. Applicants are aware of no commercial filter press that provides a wedge zone which is continuously adjustable while the filter press is operating to deliquify a material. Wedge zones are shown in U.S. Pat. No. 4,181,616 to Bahr, U.S. Pat. No. 3,894,486 to Sparowitz, U.S. Pat. No. 4,053,419 to Pav, U.S. Pat. No. 4,584,936 to Crandall and U.S. Pat. No. 4,681,033 to Crandall.

The advantages obtained by employing a wedge zone depend upon the extent to which the sludge can be deliquified and preset in a particular wedge zone, and thus relate to the amount of pressure that can be applied to the sludge in the wedge zone. If too much pressure is applied in the wedge zone, the wedge angle being very small, rapid compression of the sludge occurs, resulting in the migration of the sludge beyond the marginal edges of the belts. If this occurs, very little stable sludge will be delivered to the first perforated drum. On the other hand, if the pressure in the wedge zone is too low, the wedge angle being too large, not enough deliquifying occurs in the wedge zone, and the sludge is not fully and evenly distributed across the belts and is too wet when it reaches the first perforated drum. This results in the migration of the wet sludge from the sides of the perforated drum.

Therefore, there is a need for an apparatus for adjusting, in a controlled manner, the wedge angle and thus the wedge pressure in the wedge zone during operation of the belt filter so that a sludge can be efficiently deliquified and properly preset prior to entering the high pressure stage.

Another way in which a sludge can be more efficiently deliquified in a wedge zone is to solve the problem of migrating sludge beyond the marginal edges of the belts. If the marginal edges of the belts are substantially sealed, the sludge can bear a greater wedge pressure without migrating through the substantially sealed marginal edges. Thus, there is also a need to provide practical sealing means for the marginal edges of the belts.

Still further, while known wedge zones increase the efficiency of the deliquification of the sludge, improvements in the inducement of shear forces in the sludge would increase deliquification and presetting in the wedge zone. Thus, any improvements in the deliquifying and presetting action in the wedge zone or elsewhere in a filter press would be accepted and employed immediately.

The present invention is directed to the controlled adjustment of the wedge pressure in the wedge zone, the sealing of the marginal edges of the belts, as well as other techniques and structures for inducing the deliquifying and presetting action in the wedge zone or otherwise increasing efficiency in the wedge zone.

SUMMARY AND OBJECTS OF THE INVENTION

The present invention relates to a belt filter press for dewatering or deliquifying a material such as a sludge, slurry, fiber suspension, etc., the press having upper and lower belts which converge together in a wedge zone to compress, and thus deliquify, a material between the belts in preparation for high pressure deliquification, belt supports for supporting the belts in the wedge zone, a cam assembly for controllably adjusting the wedge angle in the wedge zone by moving at least one belt support while the belts are moving, and a cam actuating device for actuating the cam assembly.

In the preferred embodiment, the cam assembly includes slide cam members which are slideably movable relative to one another to narrow or widen the wedge angle between the belts. The slideable movement of the slide cam members can be accomplished by two hydraulic cylinders or any other means which can function to move the slide cam members (such as stepping motors) associated with a slide cam assembly on either side of the belt supports, preferably the lower belt supports. The slide angle defined between the slide surfaces of the slide cam members preferably approaches a self-locking angle which provides stability to the relative position of the slide cam members, and thus the wedge angle. In the preferred embodiment, the slide angle is approximately 10°, but can vary depending upon the materials used to construct the slide cam members, the expedient used to move the lower belt supports (hydraulic cylinder or other expedient), the weight of the lower belt supports, etc.

Also in the preferred embodiment, the lower belt supports include numerous belt support members which are concave-like in shape. Preferably the lower belt support members have wedge-shaped end enclosure sections which force the marginal edges of the upper and lower belts upwardly, creasing the belts together where the wedge-shaped end enclosure sections meet the medial support section. This not only facilitates the sealing of the marginal edges of the belts to prevent migration of the material being deliquified, but also aids in defining a confined pocket in which the material to be deliquified is worked during the sinusoidal or undulated movement through the wedge zone. Thus another feature of the preferred embodiment is to alternately and oppositely arrange the upper and lower belt supports or belt support members such that a sinusoidal shearing action is imparted to the material held between the belts.

Still further, in the preferred embodiment, the marginal edges of the upper and lower belts are sealed at the beginning of the wedge zone, prior to a concave-like shaped lower belt support member, or throughout the wedge zone by sludge retaining wheels. The sludge retaining wheels can be adjustably positioned against the upper and lower belts and/or spring-biased against the upper and lower belts to seal the marginal edges of the belts.

Yet another feature of the preferred embodiment is directed to the uniform movement of both sides of the lower belt support members, or upper belt support members as the case may be, through the use of any suitable means, such as a rack and pinion assembly operatively associated with the hydraulic cylinders and slide cam assemblies on either side of the lower belt support members.

Although many of the above features are incorporated into the preferred embodiment, the present invention is also directed to many of these features independently or in conjunction with one another, as indicated in the claims and otherwise by the nature of the invention disclosed herein. The same is true of that aspect of the present invention related to the method.

Thus the present invention also relates to a method of deliquifying a material in a belt filter press having upper and lower belts converging towards one another in a wedge zone, including the steps of arranging upper and lower belt support members alternately and oppositely throughout at least a portion of the wedge zone, moving the upper and lower belts through the wedge zone in a shear inducing sinusoidal manner, and adjusting the wedge angle during the movement of the upper and lower belts by moving at least one of the upper or lower belt supports to narrow or widen the wedge angle.

In the preferred method, the marginal edges of the upper and lower belts will be forced in an upward direction to provide a substantially sealed arrangement at the marginal edges and to form a substantially confined pocket of material to be deliquified. The preferred method also contemplates the use of supplemental sealing means in the form of sludge retaining wheels at at least the beginning of the wedge zone. In addition, the step of uniformly moving at least one of the belt supports, preferably the lower belt support during adjustment of the wedge angle is provided. In the preferred embodiment, the means for moving at least one of the belt supports in a uniform manner is rack and pinion assemblies on either side of the belt support to be moved.

Accordingly, it is an object of the present invention to increase the efficiency of deliquifying and presetting the thickness and consistency of a sludge in a wedge zone or elsewhere in a belt filter press.

It is another object of the present invention to provide for the controlled adjustability of the wedge pressure in the wedge zone.

It is another object of the present invention to provide belt supports which facilitate the sealing of the marginal edges of the belts, and facilitate the inducement of an advantageous shearing action in the sludge during deliquification.

It is another object of the present invention to provide sealing means and a method for sealing the marginal edges of the belts before entering the wedge zone and/or throughout the wedge zone.

It is another object of the present invention to provide a method of deliquifying sludge by inducing a shearing action for massaging a sludge in addition to merely compressing it.

BRIEF DESCRIPTION OF THE DRAWINGS

The foregoing and other objects of the present invention will become apparent, as will a better understanding of the concepts underlying the present invention, by reference to the description which follows and refers to the accompanying drawings in which.

DETAILED DESCRIPTION OF THE DRAWINGS

Figure 1:
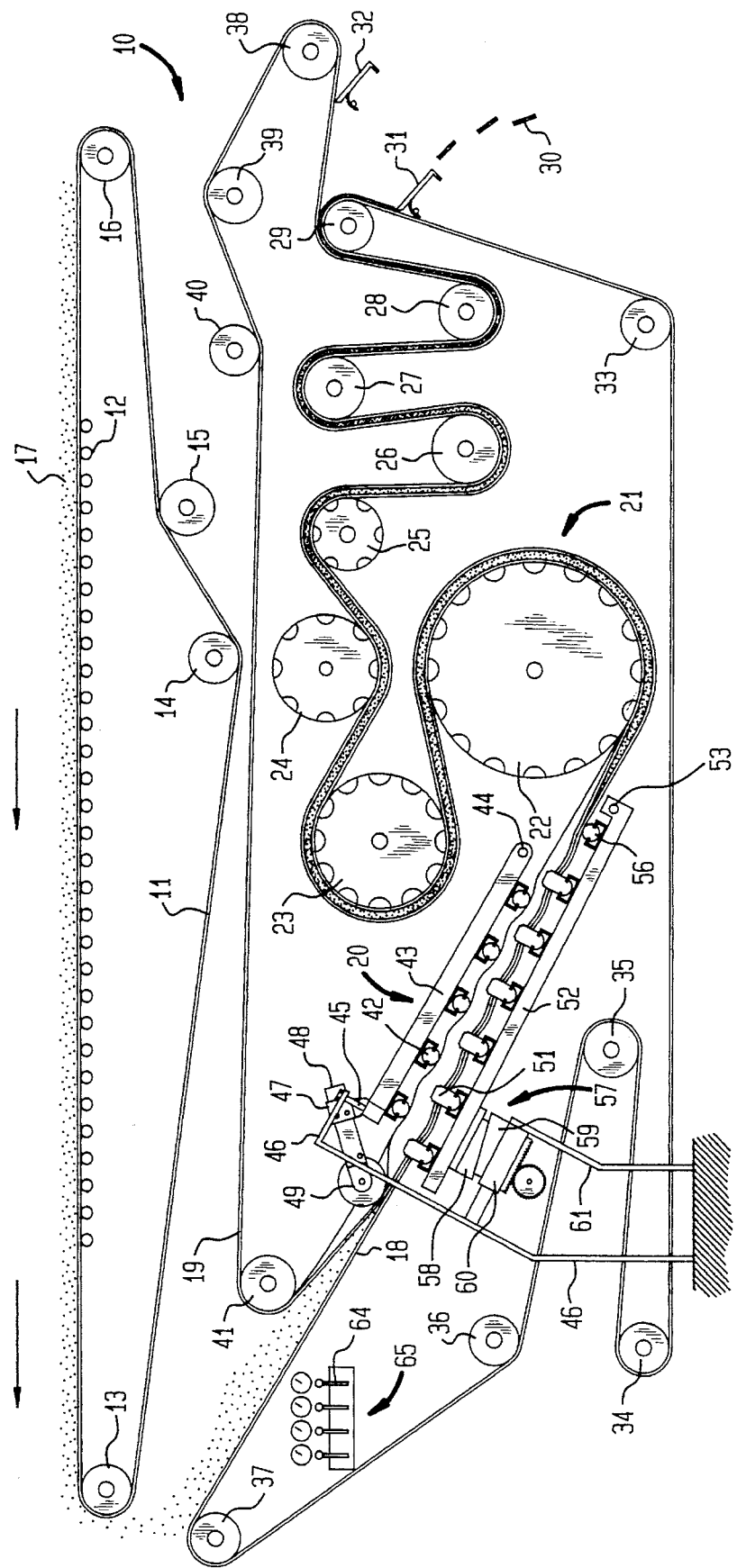
FIG. 1 is a side elevational view of a belt filter press in accordance with the present invention.

Referring to FIG. 1, a belt filter press generally designated as 10 in accordance with the present invention is illustrated. The belt filter press 10 includes a gravity drainage belt 11 which is supported, at its top flight, by a series of small rollers 12, and is carried by rollers 13, 14, 15 and 16. The belt 11 is adapted to receive a sludge 17 on the upstream side of the top flight of belt 11. If necessary, the sludge 17 will have been flocculated prior to being fed onto belt 11. As the sludge 17 is conveyed along the top flight of belt 11, free water drains through the belt 11 into liquid collecting trays (not shown), which carry and dispose of the drained liquid. The drainage of the free water in sludge 17 and the distribution of the sludge across the belt 11 is facilitated by plow assemblies (not shown) and churning devices (not shown).

Figure 2:
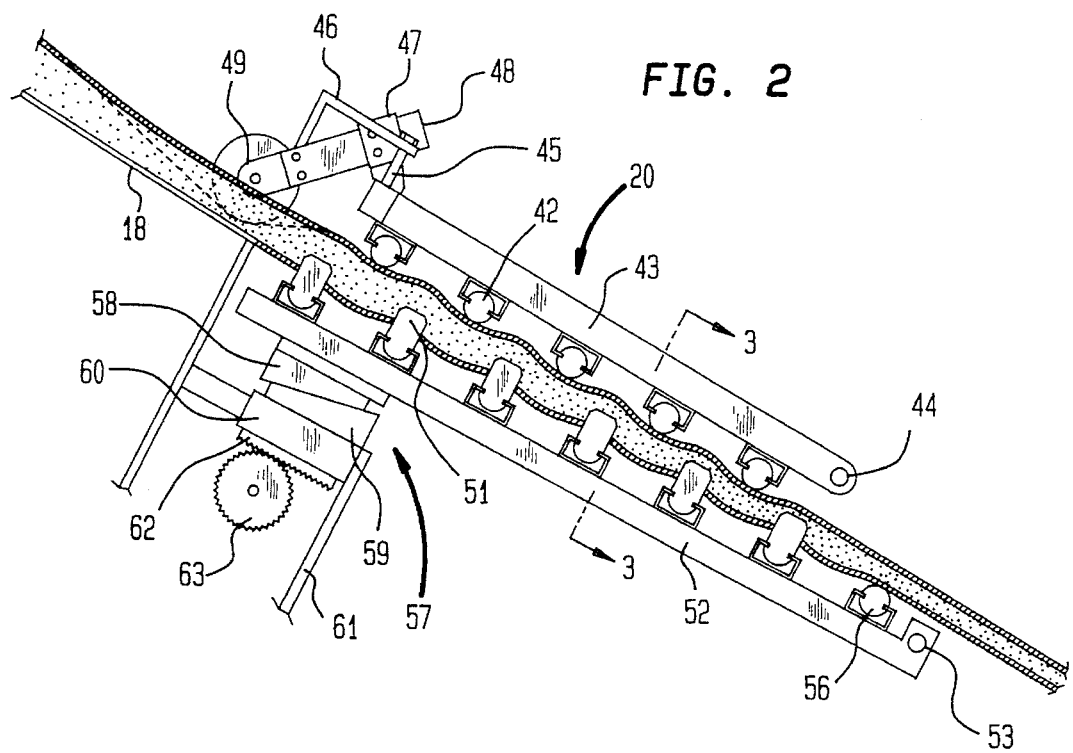
FIG. 2 is an enlarged side view of the wedge zone in FIG. 1, the belts being in partial section.

As the sludge 17 reaches the downstream side of the top flight of belt 11, at roller 13, it drops the sludge 17 onto a lower belt 18 which cooperates with an upper belt 19 in the wedge zone, generally designated as 20, and in the high pressure zone, generally designated as 21. As shown in FIGS. 1 and 2, lower belt 18 converges with upper belt 19 in the wedge zone 20 to sandwich the sludge 17, and the belts 18 and 19 enter the high pressure zone 21 together as they are wound around perforated drum 22.

The upper and lower belts 18 and 19, together with the sludge 17, are threaded through the high pressure zone 21 around perforated drums 23, 24 and 25, throughout which medium to high pressure deliquifying occurs around the perforated drums. Again, the liquid drained from the sludge 17 in the perforated drum area is carried off by pans and other structures not shown. As can be appreciated, as the perforated drums become smaller, the pressure imparted to the upper and lower belts 18 and 19 increases, thus progressively compressing sludge 17 to deliquify the same. From perforated roller 25, the upper and lower belt sandwich is wound around a series of solid rollers 26, 27, 28 and 29, throughout which very high pressure is imparted to the upper and lower belts to further compress and deliquify such sludge 17.

Upon leaving the high pressure zone 21, after a partial winding around roller 29, the lower belt 18 and upper belt 19 are separated. The sludge 17, now in the form of substantially dried cake 30 follow, in most cases, the lower belt 18. The dried sludge or cake 30 are scraped from the lower belt 18 by doctor blade 31, and any residual dried sludge or cake on the upper belt 19 are similarly scraped off by the use of doctor blade 32.

After separation from the upper belt 19, the lower belt 18 returns to the downstream side or discharge side of the gravity drainage zone to receive additional sludge. The lower belt 18 is thus wound through a series of rollers 33, 34, 35, 36 and 37. The upper belt 19 returns to the beginning of the wedge zone 20 or prior to the beginning of the wedge zone 20, through a series of rollers 38, 39, 40 and 41. Both the lower belt 18 and the upper belt 19 may, in their separate flights, pass through washing assemblies (not shown) through which the belts are washed. Also, conventional devices used in belt filters, such as gravity, lower and upper belt take-up assemblies and gravity, lower and upper belt steering assemblies, can be employed in the belt filter press 10.

Figure 4:
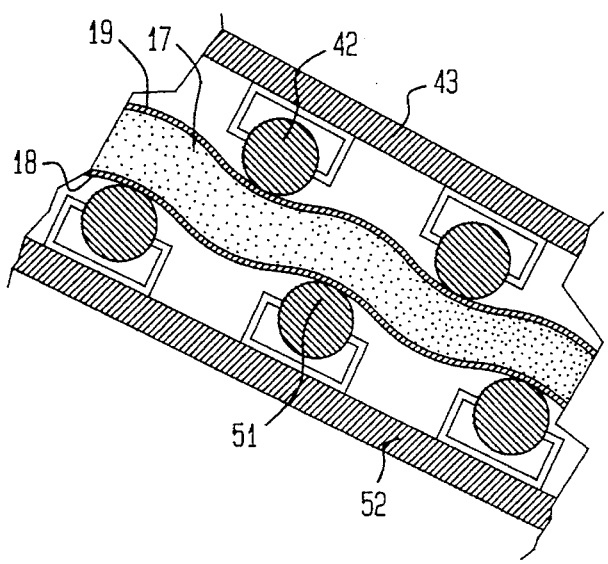
FIG. 4 is an enlarged partial side sectional view of the upper and lower belt support bars taken on line 4—4 of FIG. 3, illustrating in particular the staggered arrangement of such support bars and sinusoidal clamshell path of the upper and lower belts and sludge therebetween.
Figure 6:
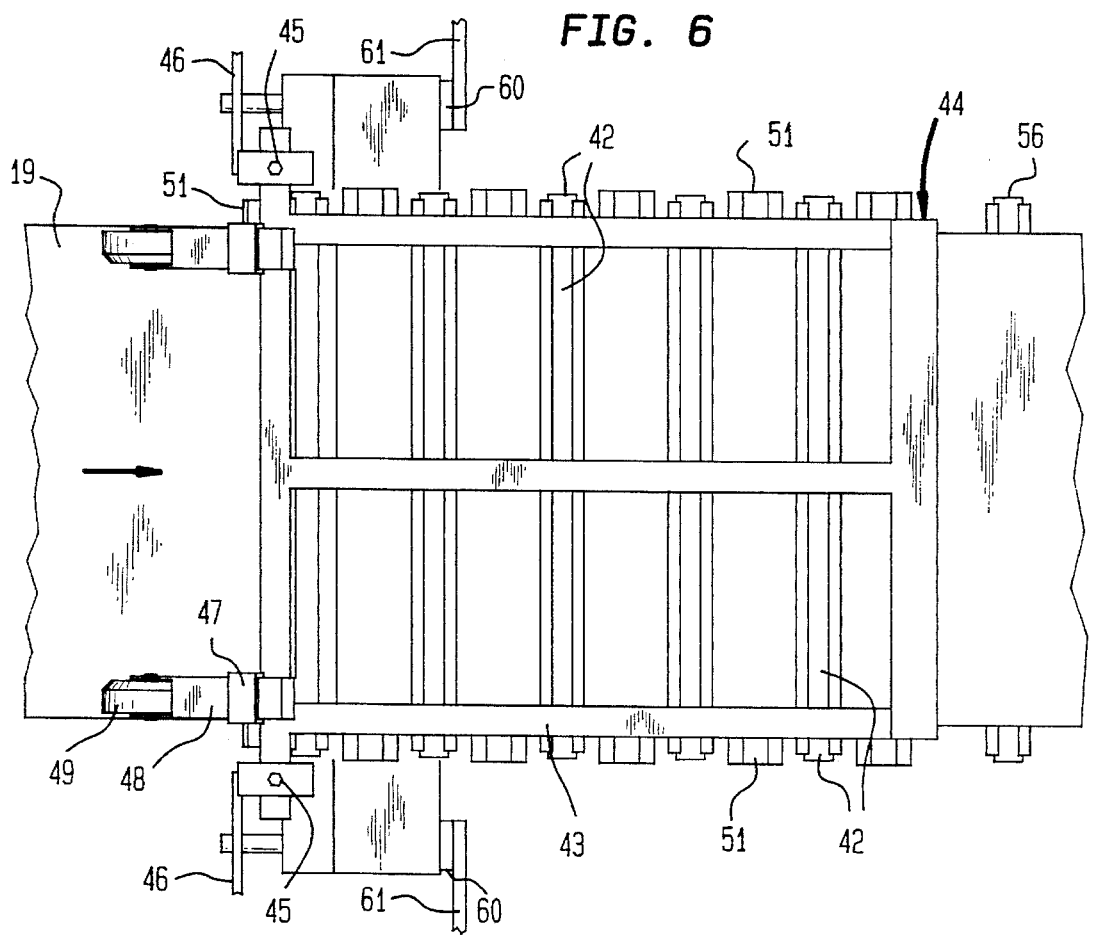
FIG. 6 is a plan view of the wedge zone shown in FIGS. 1 and 2.

Referring generally to FIGS. 1 and 2, and more specifically to FIGS. 4 and 6, the wedge zone 20 includes, in the preferred embodiment, five upper belt support members 42 which extend cross-wise the upper belt 19 and are fixed to upper frame 43, the upper frame 43 being pivotally connected to a machine frame at pivot 44. As shown in FIG. 6, the upper frame 43 includes three length-wise support bars, two cross-wise end bars and five cross-wise channel members which carry the upper belt support members 42. The upper belt support members 42 are fixed in position, but may be in the form of rollers fixed to the upper frame 43 so as to be rotatable with the upper belt 19. In such an embodiment, the frictional drag of the upper belt 19 provides rotational energy to rotate the rollers. Also, the upper belt support members 42 can be of any other shape or structure suitable for purposes of supporting the upper belt 19 in the desired position.

The upper frame 43 also carries upper frame adjustment bolts 45 which are associated with machine frame 46. The upper frame adjustment bolts 45 enable the pivotal adjustment of the upper frame 43, and thus the upper belt support members 42. As a result, the wedge angle can be preset for a particular range of angles through which the lower belt support members is movable, as explained below. In the preferred embodiment, the mechanical adjustment via the upper frame adjustment bolts 45 is normally accomplished while the filter press is not running, as opposed to the adjustment of the lower belt support members which can be accomplished while the filter press is operating to deliquify a sludge. Thus, to mechanically adjust the upper frame 43, the upper frame adjustment bolts 45 are turned with a wrench. Of course, any suitable expedient for mechanically adjusting the upper frame 43, and thus the upper belt support members 42, can be incorporated in the belt filter 10. The present invention also contemplates automatic adjustment of the upper frame 43 and upper belt support members 42, if such automatic adjustment is desired.

Figure 5:
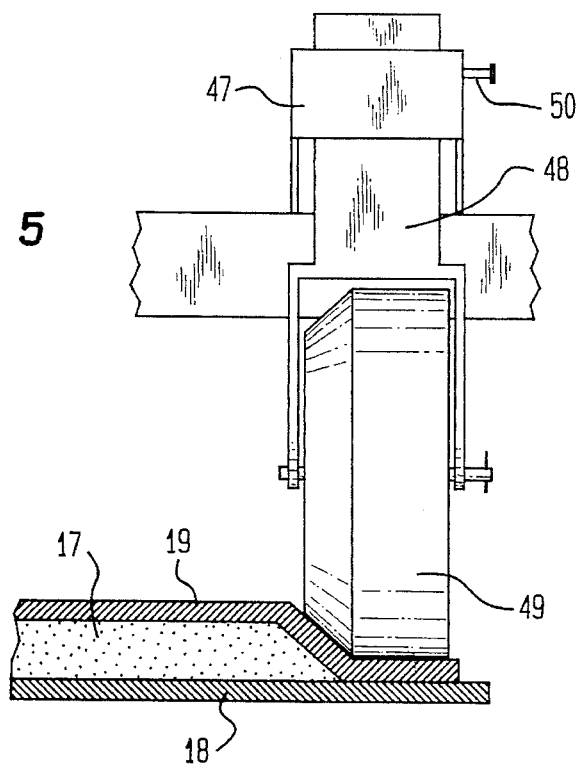
FIG. 5 is an enlarged partial upstream view of the edge sealing wheel shown in FIGS. 1 and 2.

The upper frame 43 also carries wheel supports 47 in which fork members 48, carrying the sludge retaining wheels 49, are slideably disposed. The fork members 48 include several holes, as do the wheel supports 47, and pins 50 are used to adjust the position of the sludge retaining wheels 49 against the marginal edges of the upper belt 19 and lower belt 18. As most clearly shown in FIG. 5, the sludge retaining wheels 49 have interiorly bevelled edges to facilitate the sealing of the belt edges, although such bevelled edges are not required to seal the edges. The weight of the wheels 49 and the adjusted position of the same provide for the sealing of the edges of the belts so that a higher wedge pressure can be established to thereby facilitate a greater degree of deliquification and presetting of the sludge.

Figure 7:
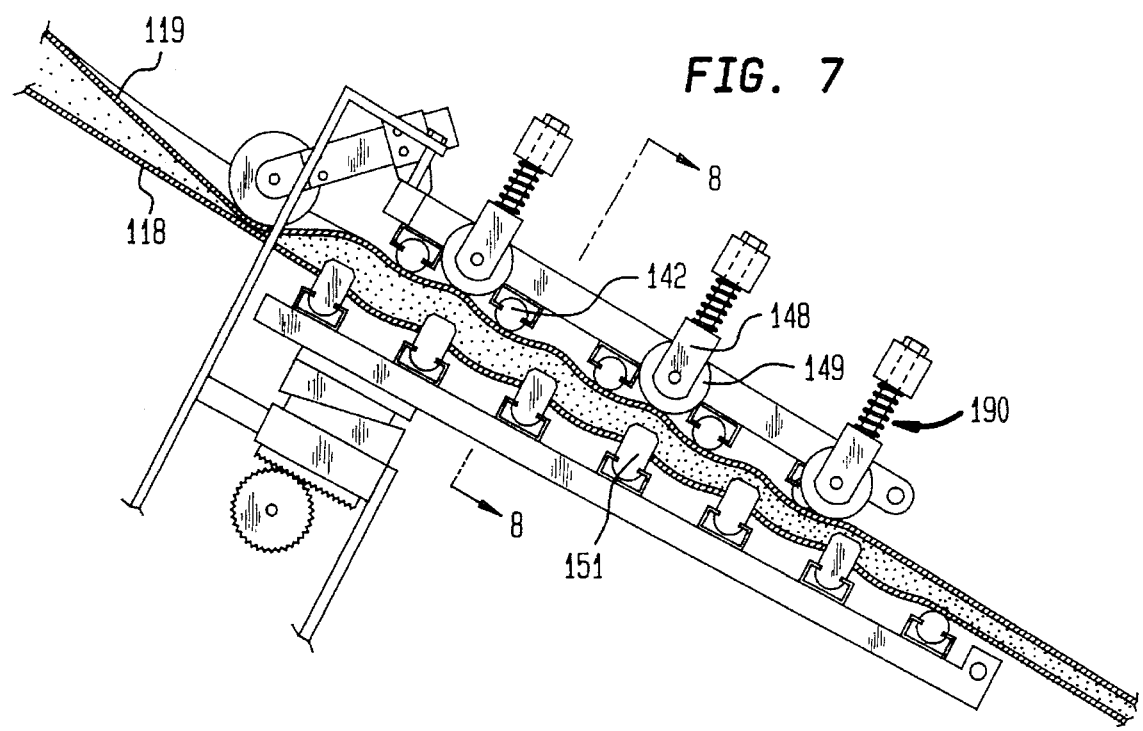
FIG. 7 is an enlarged side view of a wedge zone and edge sealing wheels in accordance with another embodiment of the present invention, the belts being in partial section.
Figure 8:
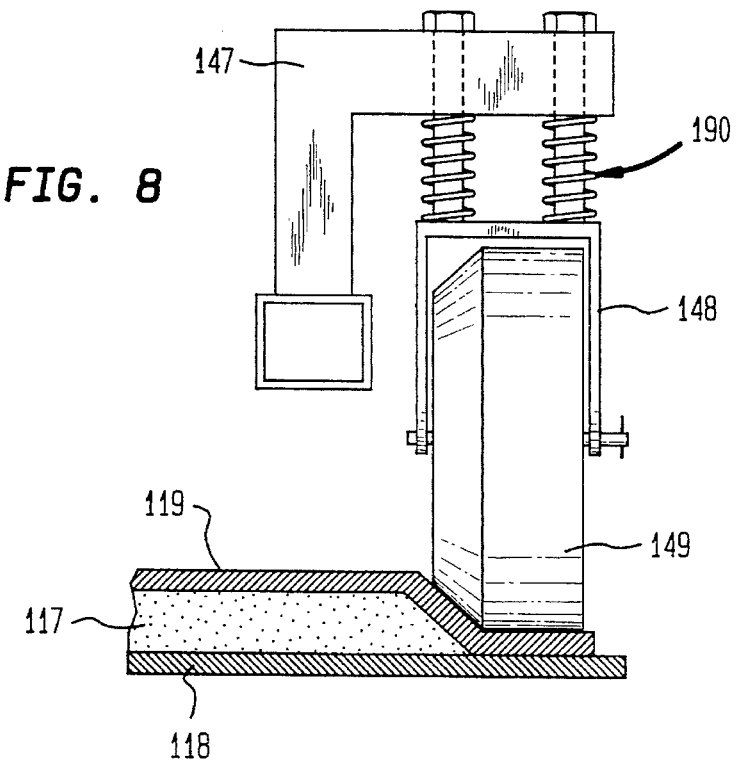
FIG. 8 is an enlarged upstream view of one of the edge sealing wheel shown in FIG. 7.

The sludge retaining wheels 49 can be attached to upper frame 43 by a spring-biased system, such as that shown in the embodiment at FIGS. 7 and 8. Also, any suitable expedient can be employed to seal the marginal edges of the belts in any desired area.

Figure 3:
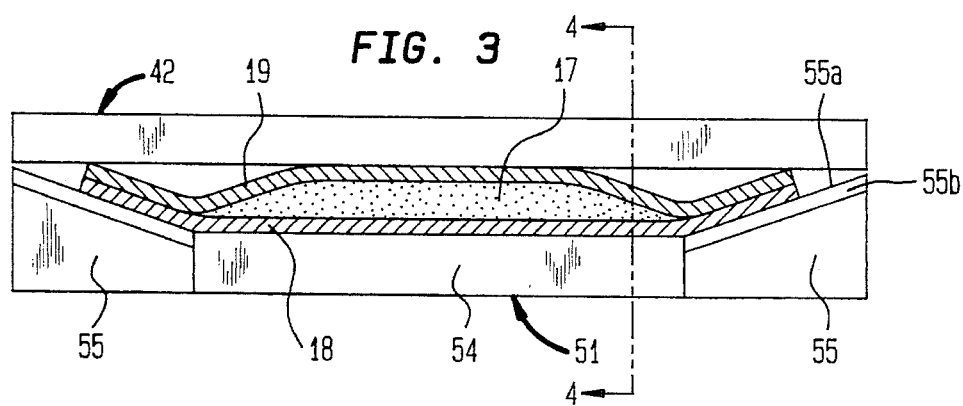
FIG. 3 is an enlarged sectional view taken on line 3—3 of FIG. 2, illustrating in particular the upper and lower belts surrounding a sludge and being sandwiched by the upper belt support bar and the lower belt support bar.

Lower belt 18 is supported by a series of lower belt support members 51 and 56, of which there are seven in the preferred embodiment. The number of support bars can be more or less depending upon the size of machine and application. The lower belt support members 51 are carried by a lower frame 52 which is pivotally connected to a machine frame at pivot 53. Each of the lower belt support members 51, as best shown in FIG. 3, is constructed with a center section 54 (or medial supports) and outer end closure sections 55, to form a concave-like surface on which the lower belt 18 and the upper belt 19 can rest. The outer end closure sections 55 are wedge-shaped such that they increase in thickness from the center section 54 outwardly. The outer end closure sections 55 include a flat support surface 55a which is flanked by bevelled edges 55b to facilitate a smooth transition of the belts downward from the flat support surface 55a.

The outer end closure sections 55 facilitate the sealing of the belt edges, as well as the formation of a confined pocket of sludge which is subjected to a sinusoidal shear-inducing action in the wedge zone 20, which is discussed below and shown more clearly in Fig. 4. The outward incline of the outer end closure sections 55 facilitate the sealing of the upper belt 19 and lower belt 18 at the marginal edges thereof, as shown in FIG. 3. This sealing effect is established by the weight of the upper belt on the lower belt and the weight of the belts being directed towards the change in direction of the belts to thus form a crease between the center section 54 and outer sections 55, and prevents the sludge 17 from migrating through such creased area and up the incline of the flat support surface 55a.

It is noted that the sealing effected by the end closure sections 55 is shown in FIG. 1 where the edges of the belts are illustrated together and the thickness of the belts and sludge between the upper belt supports 42 and the center section 54 of the lower belt supports 51 is also shown. In FIGS. 2, 4 and 7, however, the belts are shown in partial section so that the sinusoidal or undulating action of the belt can be better visualized.

The incline of the outer end closure sections 55 can be any suitable angle, depending in part on the structure of the belts being used. If the incline is too steep, the belts may be distorted; whereas too shallow an angle will not effect enough of a change in the crosswise direction of the belts to create an effective seal for a given application. In the preferred embodiment, the incline of the outer end closure sections 55 is approximately 18°, but other suitable angles will also be effective.

As shown in FIGS. 1 and 2, the downstream or lowermost lower belt support 56 is of a structure similar to the upper belt support members 42. Once again, the lower belt support members 51 and 56 are fixed in position, but can be arranged so that they or portions thereof are rotatably connected to lower frame 52. In this regard, the lower belt support members 51 can be made up of a central cylindrical member flanked by outwardly inclined cylindrical members, or any other suitable structure or arrangement consistent with the principles of the present invention.

A tapered slide cam assembly 57, shown in FIGS. 1 and 2, is associated with both sides of the lower frame 52. Each tapered slide cam assembly 57 includes an upper slide cam member 58 connected to the lower frame 52 and a lower slide cam member 59 which is slideably associated with upper slide cam member 58. In the preferred embodiment, the upper and lower slide cam members 58 and 59 are made of a high molecular weight polyethylene, which is a relatively durable material. The upper and lower slide cam members 58 and 59 include slide surfaces which together define a slide cam angle, as measured from an imaginary horizontal plane. Preferably, the slide cam angle preferably approximates a self-locking angle which can vary depending upon the weight of the lower frame 52, the coefficient of friction between the slide surfaces of the upper and lower slide cam members 58 and 59 (preferably low), the expedient for moving the lower slide cam member 59, etc. The shallow angle of the tapered slide cam assembly 57 is intended to help maintain the appropriate wedge angle and associated wedge pressure should drifting occur in the hydraulic cylinders or for any other reason. A true self-locking angle, to the extent definable with certainty, may not be possible in certain applications or in any application. That the angle used approaches a self-locking angle to provide holding and stability is enough. In connection with the preferred embodiment, the slide cam angle which provides the appropriate attributes is approximately 10°. However, the slide cam angle can be in a range from 8° to 15°, or even outside of this range, depending upon the above-noted parameters and the degree of stability required.

Each lower slide cam member 59 is connected to a hydraulic cylinder 60 on each side of the lower frame 52, although it is possible to employ just one hydraulic cylinder or other device to raise or lower both sides of the lower frame 52. In addition, as shown in FIG. 6 each hydraulic cylinder 60 is connected to machine frame 46 at one end, and machine frame 61 at the other end and is adapted to move linearly in order to move the respective lower slide cam member 59. The lower slide cam member 59, in turn, slides against the respective upper slide cam member 58 to pivotally move the lower frame 52 (and thus the lower belt support members 51) about pivot 53. Of course, this movement varies the wedge angle formed between the lower belt support members 51 and the upper belt support member 52, and thus varies the wedge pressure exerted on the lower belt 18 and upper belt 19.

In addition, although the preferred embodiment calls for the cylinders 60 to be actuated hydraulically, any other appropriate means of actuation, such as pneumatic actuation or electrical stepping motor, is contemplated herein. In this context, the means for moving the lower frame 52 need not be a cylinder, but can be any suitable expedient, again for controllably adjusting the wedge angle in the wedge zone 20. The advantage in using hydraulics is that hydraulics provides a positive control of the cylinders, and thus the movement of the lower frame 52.

In addition, as shown in FIG. 2 each hydraulic cylinder 60 is associated with a rack and pinion assembly comprising a rack 62 connected to the hydraulic cylinder 60, and a pinion gear 63. Of particular importance is the association of the pinion gears 63 on either side of the wedge zone 20. A shaft extending cross-wise under the wedge zone 20 connects the respective pinion gears 63 to help keep the tapered slide cam assembly in alignment. The pinion gears 63 and associated shaft make up for any deviance or drag in the hydraulic cylinder 60 which might result in one side of the lower frame 52 being moved higher or lower than the other side. The lower frame 52 and lower belt support members are thus squared and moved uniformly through the use of the rack and pinion assemblies.

The staggered arrangement of the upper belt support members 42 and the lower belt support members 51 is of particular importance in connection with a preferred embodiment of the present invention. As shown in FIG. 4, the staggered arrangement of the support members in the wedge zone 20 provides a serpentine or sinusoidal clamshell effect as the belts undulate around the upper and lower belt supports in the wedge zone 20. This arrangement of the upper and lower belts 18 and 19 as they carry the sludge 17 is significant because of the action imparted to the upper and lower belts 18 and 19 during the movement of such belts through the wedge zone 20. Thus, the upper and lower belts 18 and 19 not only converge towards one another in the wedge zone 20, but because of the staggered arrangement of the upper belt support members 42 and lower belt support members 51, the belts gently massage and squeeze the sludge 17 throughout the wedge zone 20. This gentle massaging of the sludge 17 helps efficiently deliquify the same in the wedge zone 20 by imparting shear forces in several directions within the sludge 17.

The shear-inducing effect is of particular help in deliquifying the sludge 17 when the lower belt support members 51 are generally concave in shape, as shown in FIG. 3 in accordance with the preferred embodiment. It is the concave-like shape, established by the wedge-shaped outer sections 55, which concentrates the sludge 17 in the central portion of the belts 18 and 19, effectively forming a confined pocket. This confined pocket arrangement does not permit the sludge 17 to simply be displaced between the belts; rather, the shear forces imparted to the sludge 17 continuously change directions in the confined pocket of sludge to provide for the highly effective deliquifying and presetting of the sludge 17.

FIGS. 7 and 8 illustrate another embodiment of the present invention, wherein the lower belt support members 151 are all of a similar construction to the upper belt support members 142. Thus, because there is no outward incline near the marginal edges of the belts 118 and 119, sealing wheels are provided throughout the length of the wedge zone 120. In this embodiment, the sludge retaining wheels 149 are connected to a frame support 147 via a spring-biasing assembly 190 which is connected to the sludge retaining wheel 149 via a fork member 148. The spring-biasing assembly permits the sludge retaining wheel 149 to move up and down to maintain an appropriate seal on the marginal edges of the belts 118 and 119.

Of course, the stiffness of the spring used in the spring-biasing assembly 190 will affect the extent to which the sludge retaining wheel 149 exerts pressure against the upper belt 119 and the lower belt 118, and the extent to which the upper and lower belts can move up and down.

Figure 9:
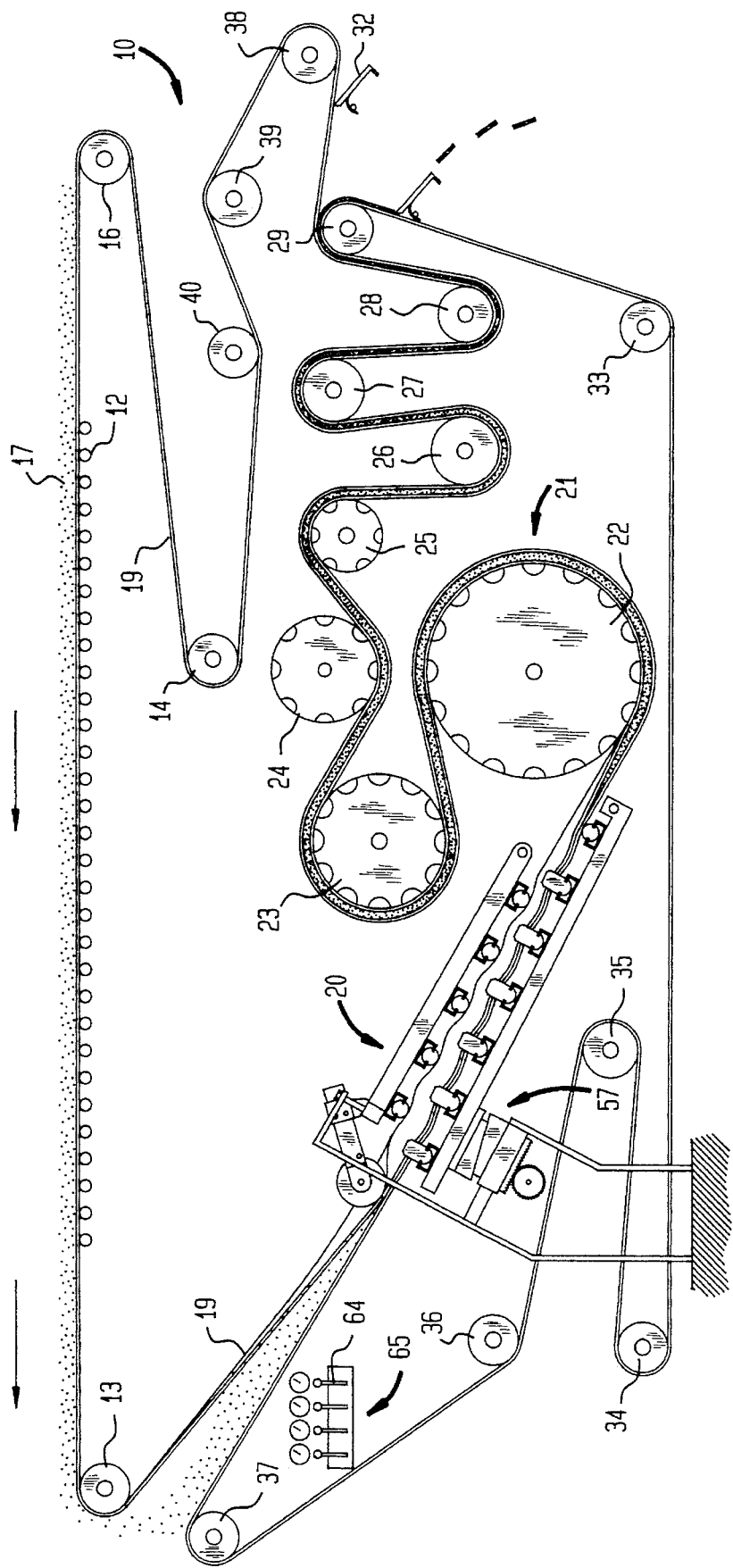
FIG. 9 is a side elevational view of a belt filter press in accordance with another embodiment of the present application, illustrating the application of the adjustable wedge on a two belt system.

In another embodiment of the present invention, shown in FIG. 9, the adjustable wedge can be employed on a two-belt filter press, whereby the upper belt serves as the gravity drainage belt as well as the upper pressure belt. Of course, yet further applications of the adjustable wedge is contemplated.

In the preferred embodiment, the hydraulic cylinder 60 is actuated by a hand valve 64 on panel 65, which provides various controls to operate the belt filter press 10 (such as take-up and steering). From a point adjacent to the control panel 65, an operator can view the belts 18 and 19 as they converge in the beginning of the wedge zone 20. The operator can see the sludge 17 bulging under the upper belt 19, and can ascertain how uniformly distributed the sludge 17 is between the belts 18 and 19. Thus, the operator can adjust the wedge angle, and therefore the wedge pressure, by actuating the hydraulic cylinder with hand valve 64. In one position, the hand valve 64 moves each of the cylinders 60 linearly towards the upstream side of the belts 18 and 19, which causes the thicker portions of the slide cam members 58 and 59 to move together to raise the lower frame 52 and lower belt support members 51. This narrows the wedge angle. The operator would adjust the wedge angle in this manner when he viewed a mass or bulge of sludge 17 in the center of the belts 18 and 19. Thus, the wedge pressure would be increased, and the sludge 17 would be compressed and forced outwardly towards the marginal edges of the belts 18 and 19.

If the operator sees that the sludge 17 is becoming very close to the marginal edges of the belts 18 and 19, or even spilling out of such edges, he will move the hand valve 64 into the opposite position, whereby each of the cylinders 60 would move linearly in the downstream direction. This causes the narrow portions of the slide cam members 58 and 59 to come together to lower the lower frame 52 and lower belt support members 51. This widens the wedge angle. This results in the wedge pressure being decreased.

An operator might also inspect or examine other portions of the belt filter press 10 as it is running in order to ascertain whether the wedge angle should be increased or decreased. One such area he may view is the perforated drum area to determine whether the sludge 17 is too wet as it exits the wedge zone 20. In addition, the wedge angle may be adjusted automatically, whether a manual operator is present or in the stead of such a manual operator. Such automatic wedge adjustment can be established by a number of different expedients, which can be used alone or together.

For instance, sensors can be provided along the marginal edges of the belts 18 and 19 to ascertain whether there is any migration of the sludge 17. The sensors could send information to a control panel to continuously and automatically adjust the wedge angle. Alternatively, sensors or strain gauges might also be placed cross-wise on a sensor bar in the area of the wedge zone to ascertain the distribution of the sludge 17 across the belts 18 and 19. Also, sensors which determine the wetness, viscosity, density or other characteristics of the sludge 17 itself might be employed to automatically and continuously set the cylinders 60, thus adjusting the wedge angle and wedge pressure appropriately.

Still further, a sludge level sensor can be provided to automatically adjust the wedge angle and wedge pressure. Such a sludge level sensor could provide a milliamp signal to a servo valve or valves which would, in turn, control the movement of the cylinders 60. The cylinders 60 would move in the appropriate direction depending upon the signal being generated by the sludge level sensor to raise or lower the lower frame 52 to narrow or widen the wedge angle.

In operation, the sludge 17 is controllably and lightly compressed and massaged in the wedge zone 20 in order to prepare the sludge 17 for the high pressure zone 21. The belts 18 and 19, and the sludge 17 sandwiched therebetween, winds through a series of staggered and converging upper and lower belt supports, imparting a sinusoidal shearing action to the sludge 17 in the confined pocket. This sinusoidal shearing action gently massages the sludge 17 in the confined pocket as the sludge 17 is continuously compressed such that the thickness of the sludge 17 at the entrance of the wedge zone 20 is greater than the thickness of the sludge 17 at the exit of the wedge zone 20. Thus, the sludge undergoes not only a wedge-type compression in the wedge zone 20, but is also continuously subjected to a massaging treatment which gently squeezes liquid from the sludge 17. This differs from a conventional wedge-type compression in that the shear forces which result in deliquification are established in different directions within the sludge 17 in the confined pocket and continuously change direction as the sludge 17 winds through the converging belt supports in a serpentine fashion.

In addition to the above, greater pressure can be applied to the sludge 17 the wedge zone 20 by sealing the marginal edges of the belts 18 and 19. This permits great efficiency in preparing the sludge 17 for the high pressure zone 21, since more liquid can be removed from the sludge 17 prior to entering the high pressure zone 21. Therefore, higher pressures can be used more quickly in the high pressure zone 21, and higher pressures can be obtained at the end of the high pressure zone 21. The result is a drier sludge cake.

While the foregoing description and figures illustrate the preferred embodiments of the belt filter press and separation method in accordance with the present invention, it should be appreciated that certain modifications can be made and are encouraged to be made in the structure, materials and techniques of the disclosed embodiment without departing from the spirit and scope of the present invention which is intended to be captured by the claims set forth immediately below.

It is claimed:

1. A belt filter press for deliquifying a material, said belt filter press comprising:
   a. a first belt having a first path of travel and a second belt having a second path of travel, said first and second belts travelling together and converging towards one another in a wedge zone through which a material is progressively compressed between said first and second belts, the angle of convergence between the first and second belts defining a wedge angle which corresponds to the degree of pressure exerted on the material in the wedge zone;
   b. a first belt support for supporting said first belt in said wedge zone and a second belt support for supporting said second belt in said wedge zone;
   c. a cam assembly operatively associated with at least one of said belt supports for controllably adjusting the wedge angle by moving at least one of said belt supports while said first and second belts are moving in said respective first and second paths of travel; and
   d. a cam-actuating device for actuating said cam assembly to either decrease or increase said wedge angle.

2. The belt filter press in claim 1, wherein said cam assembly includes at least a first cam member connected to one of said first or second belt supports and a second movable cam member associated with said first cam member, said second cam member being movable to cause the movement of at least one of said belt supports upon actuation of said cam assembly by said cam-actuating device.

3. The belt filter press in claim 2, wherein said first and second cam members include slide surfaces along which said first and second cam members are slideably associated, said slide surfaces together defining a slide angle which is measured relative to an imaginary horizontal plane.

4. The belt filter press in claim 3, wherein said slide surfaces together define a slide angle, said slide angle being in the range from approximately 8° to approximately 15°, as measured relative to an imaginary horizontal plane.

5. The belt filter press in claim 4, wherein said slide angle is approximately 10°.

6. The belt filter press in claim 5 wherein at least the slide surfaces of said first and second cam members are made of a weight polyethylene.

7. The belt filter press in claim 6, wherein said cam-actuating device is a hydraulic cylinder which is linearly and controllably movable, and said second cam member is linearly movable therewith.

8. The belt filter press in claim 7, wherein said first belt is an upper belt and said first belt support is an upper belt support for supporting said upper belt, and said second belt is a lower belt and said second belt support is a lower belt support for supporting said lower belt, and wherein said first cam member is connected to said lower belt support such that the movement of said second cam member causes the movement of said lower belt support.

9. The belt filter press in claim 8, wherein said cam assembly is a first cam assembly arranged in association with a first side of said lower belt support, and further comprising a first hydraulic cylinder arranged in association with said first cam assembly, and a second cam assembly of a structure similar to said first cam assembly, said second cam assembly being arranged in association with a second side of said lower belt support, and a second hydraulic cylinder arranged in association with said second cam assembly.

10. The belt filter press in claim 9, wherein said lower belt support has a first side adjacent one marginal edge of the first and second belts and a second side adjacent the other marginal edge of said first and second belts, and further comprising a device for uniformly lowering or raising the first and second sides of said lower belt support by said first and second hydraulic cylinders.

11. The belt filter press in claim 10, wherein said a device for uniformly lowering or raising the first and second sides of said lower belt support by said first and second hydraulic cylinders is a first rack and pinion assembly on said first side of said lower belt support, and a second rack and pinion assembly on said second side of said lower belt support, said pinions of said first and second rack and pinion assemblies being connected by a shaft.

12. The belt filter press in claim 10, wherein said lower belt support includes lower belt support members extending cross-wise below and in contact with said lower belt, at least a portion of said lower belt support members having a belt support surface which is concave-like in shape.

13. The belt filter press in claim 8, wherein said upper and lower belts have marginal edges, and further comprising at least one sludge retaining wheel for sealing the marginal edges of said upper and lower belts in the area of the wedge zone to prevent migration of the material to be deliquified beyond said marginal edges.

14. The belt filter press in claim 13, wherein said at least one sludge retaining wheel is provided only at the beginning of the wedge zone.

15. The belt filter press in claim 12, wherein sludge retaining wheels are two freely rotatable wheels arranged at the respective marginal edges of and on the upper belt.

16. The belt filter press in claim 15, wherein said freely rotatable wheels include bevelled edges on the interior side of each wheel.

17. The belt filter press in claim 15, wherein the position of said freely rotatable wheels is adjustable with respect to said belts.

18. The belt filter press in claim 17, wherein rotatable wheel includes a stationary wheel support member and a fork member being removably attachable to said support member in a number of different positions.

19. The belt filter press in claim 12, wherein sludge remaining wheels are provided at several points along the marginal edges of said upper and lower belts in the wedge zone.

20. The belt filter press in claim 19, wherein said sludge retainng wheels have freely rotatable wheels with interiorly bevelled edges, said freely rotatable wheels being spring-biased against said upper belt to seal the marginal edges of said upper and lower belts.

21. The belt filter press in claim 8, wherein said lower belt support includes lower belt support members extending cross-wise below and in contact with said lower belt, at least a portion of said lower belt support members including a medial support section flanked by two outer support sections, said outer support sections extending upwardly from said medial support section, and whereby the marginal edges of said first and second belts lie in a substantially sealed arrangement on said outer support sections.

22. The belt filter press in claim 21, wherein each said outer support section includes a substantially flat support surface and bevelled edges on either side of said flat support surface.

23. The belt filter press in claim 22, wherein said upper belt support includes upper belt support members extending cross-wise on top of said upper belt.

24. The belt filter press in claim 23, wherein at least a portion of said lower belt support members extend cross-wise beyond the marginal edges of said upper and lower belts and at least a portion of said upper belt support members extend cross-wise beyond the marginal edges of said upper and lower belts.

25. The belt filter press in claim 23, wherein said upper belt support members are arranged between said lower belt support members such that the upper and lower belts and the material therebetween can be threaded through said respective support members in a shear-inducing serpentine manner so that the material between said belts is massaged in addition to being compressed in the wedge zone.

26. The belt filter press in claim 3, wherein said first and second cam members are generally wedge-shaped members.

27. The belt filter press in claim 19, wherein said sludge retaining wheels have freely rotatable wheels with interiorly bevelled edges, said freely rotatable wheels being spring-biased against said upper belt to seal the marginal edges of said upper and lower belts.

28. The belt filter press in claim 1, wherein said cam assembly is a first cam assembly arranged in association with a first side of said lower belt support, and further comprising a first cam-actuated device arranged in association with said first cam assembly, and a second cam assembly of a structure similar to said first cam assembly, said second cam assembly being arranged in association with a second side of said lower belt support, and a second cam-actuated device arranged in association with said second cam assembly.

29. The belt filter press in claim 28, wherein said lower belt support has a first side adjacent one marginal edge of the first and second belts and a second side adjacent the other marginal edge of said first and second belts, and further comprising a device for uniformly lowering or raising the first and second sides of said lowerbelt support by said cam-actuating devices.

30. The belt filter press in claim 29, wherein said device for uniformly lowering or raising the first and second sides of said lower belt support by cam-actuating devices is a first rack and pinion assembly on said first side of said lower belt support, and a second rack and pinion assembly on said second side of said lower belt support, said pinions of said first and second rack and pinion assemblies being connected by a shaft.

31. The belt filter press in claim 1, wherein said lower belt support includes lower belt support members extending cross-wise below and in contact with said lower belt, at least a portion of said lower belt support members including a medial support section flanked by two outer support sections, said outer support sections extending upwardly from said medial support section.

32. The belt filter press in claim 31, wherein said upper belt support includes a number of upper belt support members extending cross-wise on top of said upper belt, and wherein said lower and upper belt support members are staggered from one end of said wedge zone to the other end of said wedge zone, such that said upper belt support members are arranged between said lower belt support members and the upper and lower belts and the material therebetween can be threaded through said respective support members in a shear-inducing serpentine manner, so that the material between said belts is massaged in addition to being compressed in the wedge zone.

33. The belt filter press in claim 32, wherein each said outer support section includes a substantially flat support surface and beveled edges on either side of said support surface.

34. The belt filter press in claim 1, wherein said lower belt support includes lower belt support members extending cross-wise below and in contact with said lower belt, and said upper belt support includes a number of upper belt support members extending cross-wise on top of said upper belt, said lower and upper belt support members being in a staggered arrangement such that said upper belt support members are arranged between said lower belt support members and when the wedge angle is small enough, the upper and lower belts and material therebetween are threaded through said respective support members in a shear-inducing serpentine manner, whereby the material between said belts is massaged in addition to being compressed in the wedge zone.

35. A belt filter press for deliquifying a material, said belt filter press comprising:

a. a lower belt having a first path of travel and an upper belt having a second path of travel, said lower and upper belts travelling together and converging towards one another in a wedge zone through which a material is progressively compressed between said lower and upper belts, the angle of convergence between the lower and upper belts defining a wedge angle which corresponds to the degree of pressure exerted on the material in the wedge zone; and b. a lower belt support for supporting said lower belt in said wedge zone and an upper belt support for supporting said upper belt in said wedge zone, at least one of said belt supports being moveable while said lower and upper belts are moving in said respective first and second paths of travel in order to adjust the wedge angle in the wedge zone, said lower belt support including lower belt support members extending cross-wise below and in contact with said lower belt, said upper belt support including upper belt support members extending cross-wise on top of said upper belt, said lower and upper belt support members being alternately and oppositely arranged in at least a portion of said wedge zone so that the upper and lower belts and the material therebetween are threaded through said respective support members in a shear-inducing serpentine manner, resulting in the material between said belts being massaged in addition to being compressed in the wedge zone, at least a portion of said lower belt support members including a medial support section flanked by two end closure support sections, said end closure support sections extending upwardly and outwardly from said medial support section, whereby the marginal edges of said lower and upper belts lie in a substantially sealed arrangement on said end closure support sections.

36. A belt filter press for deliquifying a material, said belt filter press comprising:

a. a first belt having a first path of travel and a second belt having a second path of travel, said first and second belts travelling together and converging towards one another in a wedge zone through which a material is progressively compressed between said first and second belts, the angle of convergence between the first and second belts defining a wedge angle which corresponds to the degree of pressure exerted on the material in the wedge zone;

b. a first belt support for supporting said first belt in said wedge zone and a second belt support for supporting said second belt in said wedge zone, at least one of said belt supports being movable while said first and second belts are moving in said respective first and second paths of travel in order to adjust the wedge angle in the wedge zone; and c. at least one sludge retaining wheel provided at each marginal edge of the first belt for sealing the marginal edges of said first and second belts in the area of said wedge zone, said sludge retaining wheel preventing the migration of the material between said first and second belts, thus enabling the use of a smaller wedge angle in a wedge zone.

37. The belt filter press in claim 36, wherein said at least one sludge retaining wheel is adjustably disposed on said first belt.

38. The belt filter press in claim 36, wherein said at least one sludge retaining wheel is spring-biased against said first belt.

39. The belt filter press in claim 36, wherein more than one sludge retaining wheel is provided on each marginal side of said first belt, and said more than one sludge retaining wheels are disposed from the upstream side of said wedge zone to the downstream side of said wedge zone.

40. The belt filter press in claim 36, wherein said sludge retaining wheels are provided at the beginning of said wedge zone at a point prior to said belt supports.

41. A belt filter press for deliquifying a material, said belt filter press comprising:

a. a first belt having a first path of travel and a second belt having a second path of travel, said first and second belts travelling together and converging towards one another in a wedge zone through which a material is progressively compressed between said first and second belts, the angle of convergence between the first and second belts defining a wedge angle which corresponds to the degree of pressure exerted on the material in the wedge zone;

b. a first belt support for supporting said first belt in said wedge zone and a second belt support for supporting said second belt in a said wedge zone, there being a first side of said first and second belt supports and there being a second side of said first and second belt supports, at least one of said belt supports being movable while said first and second belts are moving in said respective first and second paths of travel in order to adjust the wedge angle in the wedge zone; and c. first rack and pinion assembly at said first side and a second rack and pinion assembly at said second side said first and second rack and pinion assemblies being operatively associated with one another for uniformly moving said first and second sides during adjustment of the wedge angle.

42. A belt filter press for deliquifying a material, said belt filter press comprising:

a. an upper belt having a first path of travel and a lower belt having a second path of travel, said upper and lower belts travelling together and converging towards one another in a wedge zone through which a material is progressively compressed between said upper and lower belts, the angle of convergence between the upper and lower belts defining a wedge angle which corresponds to the degree of pressure exerted on the material in the wedge zone; and b. an upper belt support for supporting said upper belt in said wedge zone and a lower belt support for support said lower belt in said wedge zone, at least one of said belt supports being movable while said upper and lower belts are moving in said respective first and second paths of travel in order to adjust the wedge angle in the wedge zone, said lower belt support including lower belt support members extending cross-wise below and in contact with said lower belt, at least a portion of said lower belt support members having end closure support sections connected by a medial support section, said end closure support sections extending upwardly and outwardly from said medial support section so that the marginal edges of said upper and lower belts lie in a substantially sealed arrangement on said end closure support sections.

43. The belt filter press in claim 42, further comprising at least one sludge retaining wheel at each marginal edge of the upper belt.

44. The belt filter press in claim 43, wherein said at least one sludge retaining wheel is provided only at the beginning of said wedge zone at a point prior to said belt supports.

* * * * *

UNITED STATES PATENT AND TRADEMARK OFFICE
CERTIFICATE OF CORRECTION

PATENT NO. : 5,456,832

DATED : October 10, 1995

INVENTOR(S) : Louden et al.

It is certified that error appears in the above-identified patent and that said Letters Patent is hereby corrected as shown below:

Column 7, line 3, "(or medial supports)" should read --(or medial support section 54)--

Column 11, line 58, delete "weight"

Column 12, line 21, "said a" should read --the--

Column 12, line 43, "12" should read --13--

Column 12, line 43, after "wherein" insert --said--

Column 12, line 56, "12" should read --13--

Column 12, line 57, "remaining" should read --retaining--

Column 12, line 61, "retainng" should read --retaining--

UNITED STATES PATENT AND TRADEMARK OFFICE
CERTIFICATE OF CORRECTION

PATENT NO. : 5,456,832

DATED : October 10, 1995

INVENTOR(S) : Louden et al.

It is certified that error appears in the above-identified patent and that said Letters Patent is hereby corrected as shown below:

Column 13, lines 29-33, "27. The belt filter press in claim 19, wherein said sludge retaining wheels have freely rotatable wheels with interiorly bevelled edges, said freely rotatable wheels being spring-biased against said upper belt to seal the marginal edges of said upper and lower belts." should read --27. The belt filter press in claim 1, wherein said upper and lower belts have marginal edges, and further comprising sludge retaining wheels for sealing the marginal edges of said upper and lower belts in the area of the wedge zone to prevent migration of the material to be deliquified beyond the marginal edges of said upper and lower belts.--

Column 13, line 49, "lowerbelt" should read --lower belt--

Column 13, line 53, after "by" insert --said--

Column 16, line 27, the second instance of "support" should read --supporting--

Signed and Sealed this

Twenty-seventh Day of February, 1996

Attest:

BRUCE LEHMAN

Attesting Officer

Commissioner of Patents and Trademarks